(12) United States Patent
Tran et al.

(10) Patent No.: US 10,881,965 B2
(45) Date of Patent: Jan. 5, 2021

(54) DETECTING AND IDENTIFYING UNAUTHORIZED ACCOUNTS IN ONLINE ENVIRONMENTS

(71) Applicant: International Business Machines Corporation, Armonk, NY (US)

(72) Inventors: Richard V. Tran, San Jose, CA (US); Kevin David Hite, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/196,314

(22) Filed: Nov. 20, 2018

(65) Prior Publication Data
US 2020/0155945 A1   May 21, 2020

(51) Int. Cl.
*A63F 13/75* (2014.01)
*A63F 13/67* (2014.01)
*A63F 13/798* (2014.01)
*G06F 21/31* (2013.01)
*H04L 29/06* (2006.01)
*A63F 13/00* (2014.01)
*H04W 12/00* (2009.01)
*G07F 17/32* (2006.01)

(52) U.S. Cl.
CPC ............ *A63F 13/75* (2014.09); *A63F 13/00* (2013.01); *A63F 13/67* (2014.09); *A63F 13/798* (2014.09); *G06F 21/316* (2013.01); *G07F 17/3241* (2013.01); *H04L 63/1483* (2013.01); *H04W 12/00508* (2019.01); *A63F 2300/558* (2013.01); *A63F 2300/5586* (2013.01)

(58) Field of Classification Search
None
See application file for complete search history.

(56) References Cited

U.S. PATENT DOCUMENTS 8,370,389 B1   2/2013  Dotan
8,892,469 B2  11/2014  Goldstein et al.
(Continued)

OTHER PUBLICATIONS

Chen et al., "User Identification based on Game-Play Activity Patterns," In NetGames'07: Proceedings of the 6th ACM SIGCOMM workshop on Network and System Support for Games, ACM, 2007, 6 pages.
(Continued)

*Primary Examiner* — Jason T Yen
(74) *Attorney, Agent, or Firm* — Cantor Colburn LLP; Teddi Maranzano

(57) ABSTRACT

Methods, systems, and computer products for identifying improper online player accounts are provided. Aspects include receiving, by a processor, online gaming data associated with a user account of an online gaming environment, accessing a player profile associated with the user account, wherein the player profile includes historical online gaming data of a user, analyzing the historical online gaming data of the user to determine a historical play style of the user account, analyzing the online gaming data to determine a current play style of the user account, and comparing the historical play style of the user to the current play style of the user account to determine one or more deviations between the current play style and the historical play style of the user account.

15 Claims, 5 Drawing Sheets

(56) References Cited

U.S. PATENT DOCUMENTS

| | | | | |
|---|---|---|---|---|
| 9,517,402 | B1* | 12/2016 | Vogel | G06F 21/316 |
| 10,427,048 | B1* | 10/2019 | Lundquist | A63F 13/75 |
| 2007/0111794 | A1 | 5/2007 | Hogan et al. | |
| 2008/0004107 | A1* | 1/2008 | Nguyen | G06Q 10/10 |
| | | | | 463/29 |
| 2013/0123011 | A1 | 5/2013 | Nguyen et al. | |
| 2013/0288785 | A1 | 10/2013 | Arnone et al. | |
| 2013/0296039 | A1* | 11/2013 | Engineer | A63F 13/12 |
| | | | | 463/29 |
| 2014/0045589 | A1* | 2/2014 | Paradise | A63F 13/00 |
| | | | | 463/29 |
| 2016/0330084 | A1* | 11/2016 | Hunter | H04W 4/21 |

OTHER PUBLICATIONS

Prescott, "Valve wants to take a 'machine learning' approach to Counter-Strike anti-cheat", https://www.pcgamer.com/valve-wants-to-take-a-machine-learning-approach-to-counter-strike-anti-cheati, Feb. 2017, 6 pages.

* cited by examiner

DETECTING AND IDENTIFYING UNAUTHORIZED ACCOUNTS IN ONLINE ENVIRONMENTS

BACKGROUND

The present invention generally relates to online systems, and more specifically, to detecting and identifying unauthorized accounts in online environments.

Online environments, such as esports, is a growing business and covers a wide variety of online games. In competitive gaming, the systems will group players in certain skill groups based on their level of competitiveness. This level of competitiveness can be based on historical interactions with the online game by the player or players. Typically, "veteran" players have a higher skill level than beginner players. However, in some online games, players can utilize sold, stolen, or shared accounts to play the online game. This allows for higher skilled players to compete against players of a much lower skill group. This practice is known as "smurfing." This type of behavior can negatively affect the game for lower skilled players and negatively impact their skill development. Detecting these sold, stolen, and shared accounts that are practicing "smurfing" can be challenging.

SUMMARY

Embodiments of the present invention are directed to a computer-implemented method for identifying improper player accounts in online gaming. A non-limiting example of the computer-implemented method includes receiving, by a processor, online gaming data associated with a user account of an online gaming environment, accessing a player profile associated with the user account, wherein the player profile includes historical online gaming data of a user, analyzing the historical online gaming data of the user to determine a historical play style of the user account, analyzing the online gaming data to determine a current play style of the user account, and comparing the historical play style of the user to the current play style of the user account to determine one or more deviations between the current play style and the historical play style of the user account.

Embodiments of the present invention are directed to a system for identifying improper player accounts in online gaming. A non-limiting example of the system includes a processor communicatively coupled to a memory, the processor configured to perform receiving, by a processor, online gaming data associated with a user account of an online gaming environment, accessing a player profile associated with the user account, wherein the player profile includes historical online gaming data of a user, analyzing the historical online gaming data of the user to determine a historical play style of the user account, analyzing the online gaming data to determine a current play style of the user account, and comparing the historical play style of the user to the current play style of the user account to determine one or more deviations between the current play style and the historical play style of the user account.

Embodiments of the invention are directed to a computer program product for identifying improper player accounts in online gaming, the computer program product including a computer readable storage medium having program instructions embodied therewith. The program instructions are executable by a processor to cause the processor to perform a method. A non-limiting example of the method includes receiving, by a processor, online gaming data associated with a user account of an online gaming environment, accessing a player profile associated with the user account, wherein the player profile includes historical online gaming data of a user, analyzing the historical online gaming data of the user to determine a historical play style of the user account, analyzing the online gaming data to determine a current play style of the user account, and comparing the historical play style of the user to the current play style of the user account to determine one or more deviations between the current play style and the historical play style of the user account.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
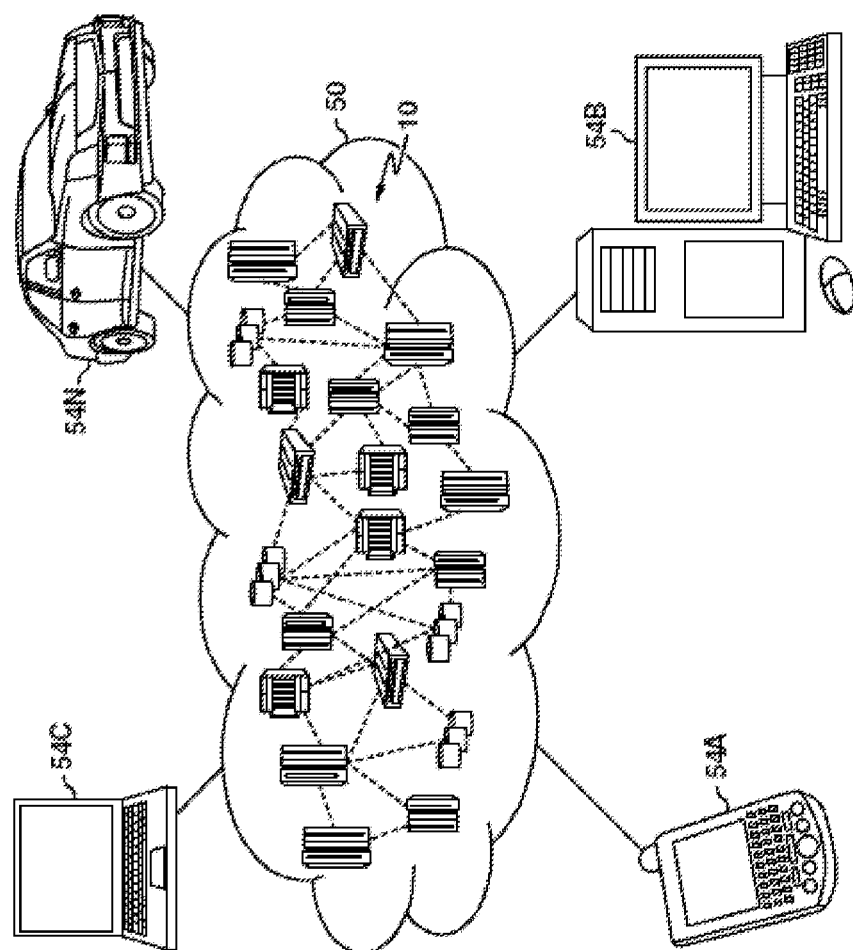
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
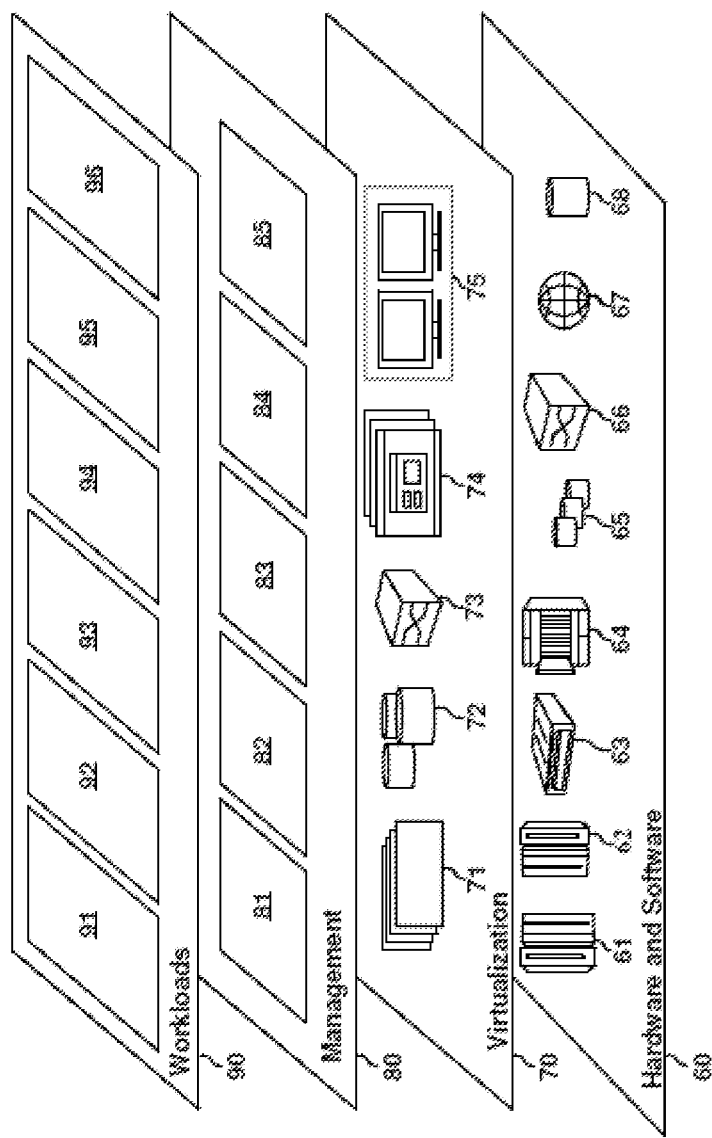
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying improper player accounts in online gaming 96.

Figure 3:
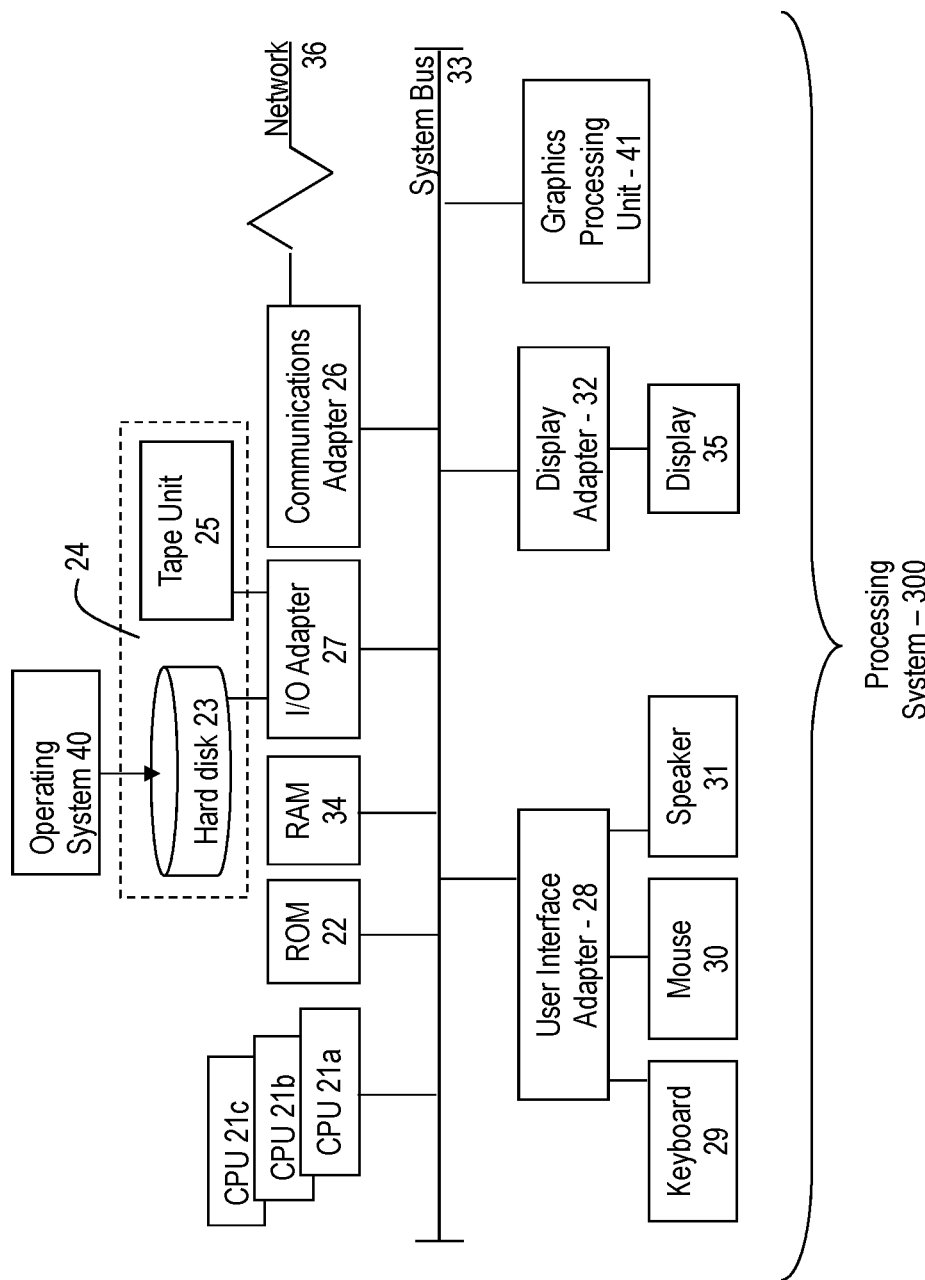
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, as mentioned above, players that exploit online games by playing at levels below their skill level by utilizing sold, stolen, and shared online accounts can detract from the satisfaction and enjoyment of online games. Online game environments can often times include hundreds, if not, thousands of users. An example of these large scale online game environments includes multiplayer online arena games that include large scale maps with hundreds of players interacting to perform aspects of the game such as competitions and even fighting battles between different groups of players. These online games are played using computing platforms such as personal computers or video game consoles. Typical of online games, the gaming environment utilizes registered accounts for players to track, among other things, the number of accomplishments of the player. For example, the number of wins, losses, and ties can be tracked. These accomplishments can allow for ranking of the player based on his or her achievements. For games that rely on rankings and or skill levels for players, the managing systems try to match players of certain skill levels together to allow for fairness in play. However, as mentioned above, some players practice "smurfing" to play against lower skilled players. Given the scale of these online communities, there can be difficulty in identifying and confirming a player is utilizing a sold, stolen, and/or shared account for the online game.

Particularly, esports are a form of competition using video games. Most commonly, esports takes the form or organized, multiplayer video game competitions, particularly between professional online game players. The most common video game genres associated with esports are real-time strategy (RTS), first-person shooter (FPS), fighting and multiplayer online battle arena (MOBA). Many competitions use a series of promotion and relegation play with sponsored teams, but more recently, competitions structured similar to professional sports, with salaried players and regular season and play-off series, have emerged. As the popularity of esports increases, the need for accurately and proactively identifying online players that are utilizes sold, stolen, and/or shared accounts exists due to this popularity and the potential to achieve monetary gain from participation in these esports.

Figure 4:
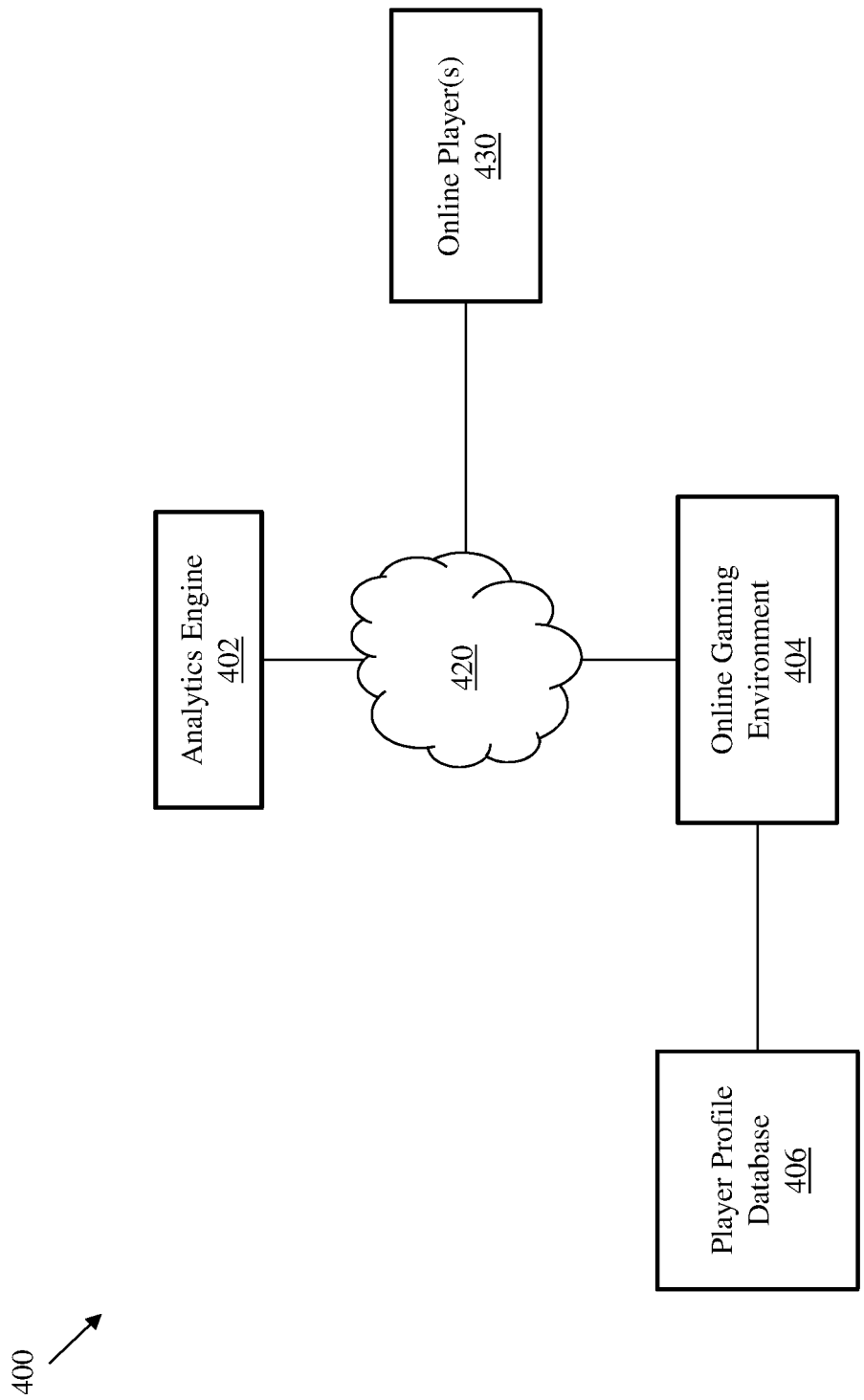
FIG. 4 depicts a block diagram of a system for detecting and identifying improper player accounts in online gaming according to one or more embodiments of the invention.

Turning now to an overview of the aspects of the invention, one or more embodiments of the invention address the above-described shortcomings of the prior art by providing a system for identifying improper player accounts in online gaming utilizing machine learning techniques. FIG. 4 depicts a system for detecting and identifying improper player accounts in online gaming according to embodiments of the invention. The system 400 includes an analytics engine 402, an online gaming environment 404, the online gaming environment 404 includes a player profile database 406, and a plurality of online players 430 accessing the online gaming environment 404 through a network 420. The network 420 can be any wired or wireless network allowing the online players 430 access to the online gaming environment 404. In one or more embodiments of the invention, the analytics engine 402 is utilized to detect and identify player accounts that have been sold, stolen, or are shared amongst other online players.

In one or more embodiments of the invention, the analytics engine 402 can identify the concept of play styles, certain techniques attributed to the players, certain "expert or high level techniques" known to players with considerable skill. Certain techniques such as, for example, programmable shortcuts and hot buttons are known to most players; however higher skill players typically utilize these techniques more often and with greater success. Other techniques such as a player having considerable knowledge of the online environment locations and utilizing these locations to their advantage can indicate a player of greater experience or skill than beginning players.

In embodiments of the invention, the analytics engine 402 can also be implemented as so-called classifiers (described in more detail below). In one or more embodiments of the invention, the features of the various engines/classifiers (402) described herein can be implemented on the processing system 300 shown in FIG. 3, or can be implemented on a neural network (not shown). In embodiments of the invention, the features of the engines/classifiers 402 can be implemented by configuring and arranging the processing system 300 to execute machine learning (ML) algorithms. In general, ML algorithms, in effect, extract features from received data (e.g., inputs to the engines 402) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 402 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

To train the machine learning model, the analytics engine 402 can utilize an initial training set of placement games that determine a player's skill group for online gaming environments 404. Placement games are games for online players to determine a skill level for placement in certain leagues or competition levels. Certain games will encourage competition by placing similarly skilled players in certain leagues such as, for example, a master league, an expert league, and a novice league, for example. The higher the skill, the more rewarded the player for winning or placing. For the purpose of detecting another user, community game play data would not be useful. The initial training set would be the placement games and it would be adjusted with each additional game that the online account plays to adjust for player progression whether the player improves or gets worse. The learning model can anticipate that such changes would be incremental and not a drastic change for an online account. Also for some competitive game, there is a concept of competitive seasons and players might need to re-do their placement games at the start of each competitive season. In these cases, the analytic engine 402 can start building newer models as a season change could have a major gameplay change. In the case of smaller changes (e.g., game patches), the analytics engine 402 would give a heavier weight to games on the current patch and less emphasis on games from the previous patch.

In one or more embodiments of the invention, the placement games and historical game play for online players 430 can be included in the player profile stored in the player profile database 406. The analytics engine 402 can utilize the historical game play and the placement games of an online player to determine a play style for the particular online player. In one or more embodiments of the invention, the analytics engine 402, once a machine learning model is trained, can analyze real-time or close to real-time game play of online players 430 to determine any deviations in the game play, skill level, techniques, and the like for the online players 430. These deviations can be indicative of an online player that is utilized a sold, stolen, and/or shared account for the online gaming environment 404. That is to say, the online player utilizing the account is not the same online player that has historically been using the account or who has participated in the placement games.

In one or more embodiments of the invention, the analytics engine 402 can analyze an online player's current play style and determine a skill level or skill level range. For example, a player can be determined to be a beginner, novice, adept, expert, master, and the like or could have a numerical level assigned to the player based on the play style and skill. This skill level can be stored in the player profile associated with the user account of the player. In one or more embodiments of the invention, the player's current play style can be compared to other players in the online gaming environment of the same or similar skill level.

In one or more embodiments, the playing style can be broken down into three categories: aim, movement, and look. Each specific category can have an associated machine learning model. The aim category can be based on targeting some sort of projectile from the player's character to an opposing target. A player's ability to impact targets that require inputting control signals to a controller, mouse, keypad, or the like to maneuver the player's character to target and hit an opposing player or target. The quantification for this category is to identify the proximity of an aimed shot to a valid target. Also, if some targets are of higher value, that will also be taken into account when building the machine learning model. When multiple shots are taken, a precision value can be determined based on the accuracy of the first shot related to the following shots.

The movement category focuses on the movement of the player's character and can be further broken down into two categories such as speed and dexterity. For speed, the analytics engine 402 can be measured by how fast a player travels from a first zone in the online environment 404 to another zone in the online environment 404. Dexterity can be measured by how well players can dodge attacks or shots from other players or how quickly a player can clear a zone in the online environment 404.

The look category applies to how a player scans or views the online environment 404. In a first person perspective online game, the look category can be measured by how well the online player utilizes the control input for their mouse or controller. In multiplayer online battle arenas, the looks category can be based on how well a player is able to maneuver an overhead view to look at different areas in the online environment 404.

In one or more embodiments of the invention, the analytics engine 402 can access a player profile to analyze historical online gaming data associated with an online account. From this historical online gaming data, the analytics engine 402 can determine a play style and skill level looking at the categories described above. The historical play style and skill level can be compared to a current play style and skill level of the player of the online account. Based on a difference between either or both the play styles or skill levels, the analytics engine 402 can determine that the online account is being utilized by a player that does not match the player that has historically utilized the online account. The online account can be flagged as suspected of being sold, stolen, or shared and an action can be taken against the online account.

As described above, machine learning techniques are utilized by the analytics engine 402 to determine, based on the game play data, that a player is utilizing an online account that does not match the player's play style and skill level in the online gaming environment 404. For example, the analytics engine 402 can extract features from the online gaming data to build a feature vector. The feature vector can be analyzed by machine learning techniques to identify and determine players that are improperly utilizing an online account in the online gaming environment 404 by clustering play styles and skill techniques. The difference in skill level of the player and the historical skill level of the online account can be compared to one or more thresholds to determine the online account has been sold, stolen, or shared with other players. Once the online account is identified of improper usage, a penalty to enact against the online account. The level of improper utilization of an online account can be determined by a variety of machine learning techniques. Also, the level can be determined by other players in the online gaming environment 404 or by a game administrator. For example, if a player is suspected of utilizing a sold, stolen, or shared online account, a description of the infraction can be generated and presented to the players in the online gaming environment. The other players can rate the infraction (e.g., high, medium, low, etc.) and also vote on or recommend certain types of penalties for the online account. Penalties can range from a complete ban from the online gaming environment 404 to a warning or temporary ban. Other penalties can include, but are not limited to, limiting access to the online gaming environment 404, limiting certain features available to the player in the online gaming environment 404, throttling the player's internet access to the online gaming environment 404, and the like.

In one or more embodiments of the invention, the analytics engine 402 can identify certain behaviors of players and online accounts that are indicative of a player selling online accounts For example, a player might open up several game accounts and play the character associated with the game accounts until they reach a certain skill level. Once a certain skill level is achieved, the game account could be sold to new or less skilled players to gain an advantage in the online game play. In embodiments, the analytics engine 402 can identify the change in game play after these online accounts have been sold to new players and determine the accounts are being utilized by players that do not match the style and skill level for the online gaming environment 404. Once identified, an action can be taken against the online account such as, for example a warning to the user, a decrease in gaming level (e.g., level 5 to level 4), a full ban from the online gaming environment 404, a throttling of online access to the online gaming environment 404, or a restriction in action to certain features of the online gaming access. For example, certain items can be restricted from the account such as decorative items for the character associated with the online account. Aside from the above mentioned penalties, such as a user ban, a penalty could be penalize players by forcing bad-faith players into matches against each other. For example, Counter-Strike Global Offensive will queue together players with good standings together and similarly for players of bad standing in what they call their trust factor matchmaking.

In one or more embodiments, audio and text data can be analyzed by the analytics engine 402 to identify and detect discussion of online accounts that are suspected of improper usage. In addition, certain keywords can be analyzed to trigger an analysis such as jargon terms associated with the online gaming environment 404. In first-person combat games, terms like "smurfing" can be added to a jargon lexicon to assist with identifying potential improper players on the online account. For example, a group of players at a lower level may refer to a player as smurfing based on their ability to perform above the skill level of the other players in the online gaming environment 404. The keywords can be extracted from the audio data or from message boards or instant messaging.

In one or more embodiments of the invention, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

Figure 5:
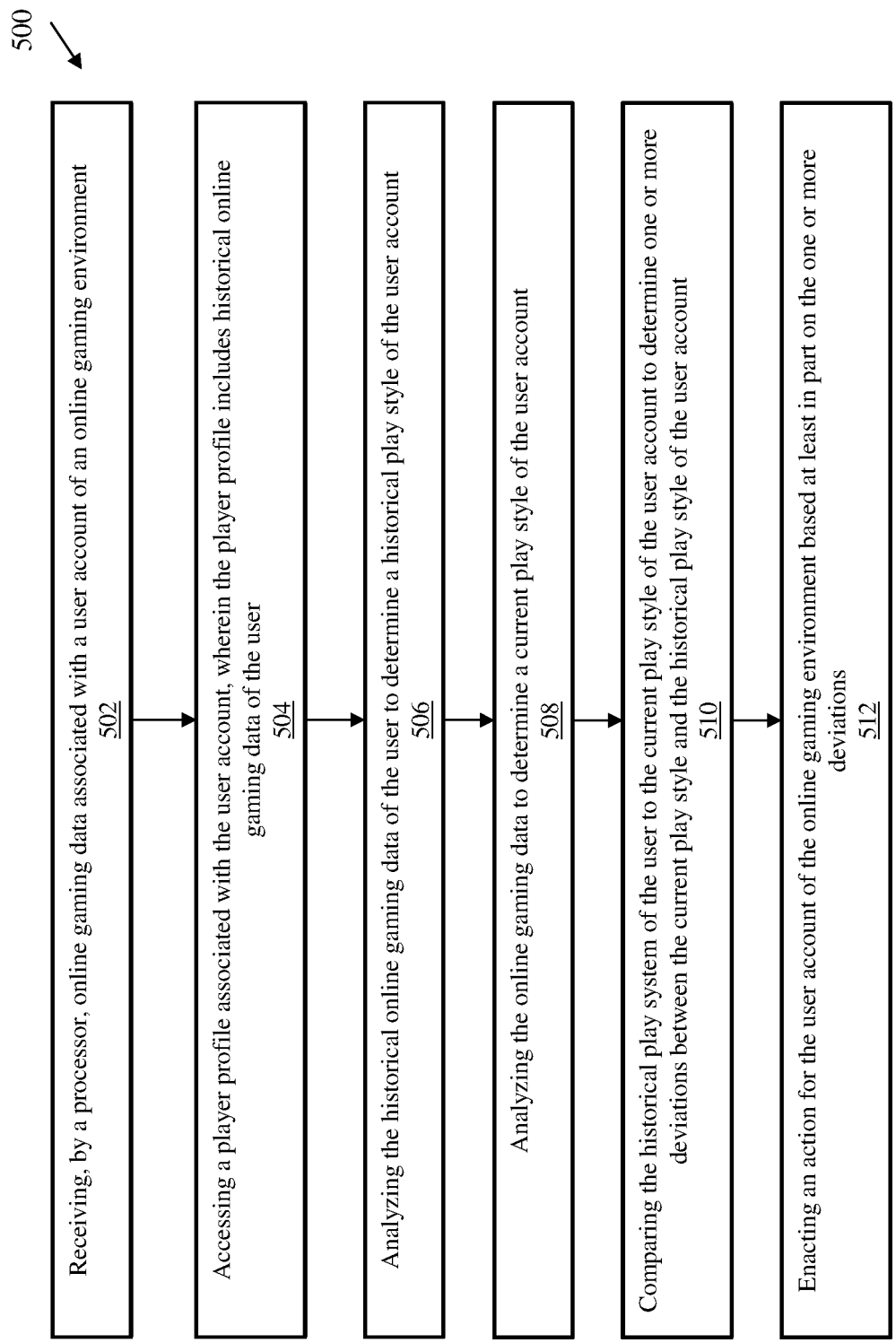
FIG. 5 depicts a flow diagram of a method for identifying improper player accounts in online gaming according to one or more embodiments of the invention.

FIG. 5 depicts a flow diagram of a method for identifying improper online user accounts according to one or more embodiments of the invention. The method 500 includes receiving, by a processor, online gaming data associated with a user account of an online gaming environment, as shown in block 502. Next, at block 504, the method 500 includes accessing a player profile associated with the user account, wherein the player profile includes historical online gaming data of the user. The method 500, at block 506, includes analyzing the historical online gaming data of the user to determine a historical play style of the user account. Next, the method 500 includes analyzing the online gaming data to determine a current play style of the user account, as shown at block 508. At block 510, the method 500 includes comparing the historical play system of the user to the current play style of the user account to determine one or more deviations between the current play style and the historical play style of the user account. And at block 512, the method 500 includes enacting an action for the user account of the online gaming environment based at least in part on the one or more deviations.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying improper online user accounts, the method comprising:
   receiving, by a processor, online gaming data associated with a user account of an online gaming environment;
   accessing a player profile associated with the user account, wherein the player profile comprises historical online gaming data of a user;
   analyzing the historical online gaming data of the user to determine a historical play style of the user account;
   analyzing the online gaming data to determine a current play style of the user account;
   comparing the historical play style of the user to the current play style of the user account to determine one or more deviations between the current play style and the historical play style of the user account;
   determining a violation level for the one or more deviations, the violation level being determined by one or more other player accounts in the online gaming environment providing a rating for each deviation in the one or more deviations; and
   enacting an action for the user account of the online gaming environment based at least in part on the one or more deviations and the violation level for the one or more deviations, wherein the action comprises a throttling of internet access speed for the user account to the online gaming environment.

2. The computer-implemented method of claim 1, wherein determining the one or more deviations comprises analyzing a feature vector, generated by a machine learning model, the feature vector comprising a plurality of features extracted from the online gaming data and the historical online gaming data.

3. The computer-implemented method of claim 1, wherein the action further comprises a ban for the user account from interacting with the online gaming environment.

4. The computer-implemented method of claim 1 further comprising:
   comparing the current playing style of the user account to a playing style of a trusted user account, wherein the user account and the trusted user account each comprise a first skill level;
   determining a second skill level of the user account based at least in part on the current playing style;
   enacting an action for the user account of the online gaming environment based on a determination that the second skill level exceeds the first skill level by a threshold level.

5. The computer-implemented method of claim 1, wherein determining the current play style of the user account comprises:
   analyzing one or more play characteristics, wherein the one or more play characteristics comprise an aiming criteria, a movement criteria, and a perspective view criteria.

6. The computer-implemented method of claim 1, wherein the online gaming environment comprises an esport.

7. A computer program product for improper online user accounts, the computer program product comprising a computer readable storage medium having program instructions embodied therewith, wherein the computer readable storage medium is not a transitory signal per se, the program instructions executable by a processor to cause the processor to perform a method comprising:

receiving, by the processor, online gaming data associated with a user account of an online gaming environment;

accessing a player profile associated with the user account, wherein the player profile comprises historical online gaming data of a user;

analyzing the historical online gaming data of the user to determine a historical play style of the user account;

analyzing the online gaming data to determine a current play style of the user account;

comparing the historical play style of the user to the current play style of the user account to determine one or more deviations between the current play style and the historical play style of the user account;

determining a violation level for the one or more deviations, the violation level being determined by one or more other player accounts in the online gaming environment providing a rating for each deviation in the one or more deviations; and enacting an action for the user account of the online gaming environment based at least in part on the one or more deviations and the violation level for the one or more deviations, wherein the action comprises a throttling of internet access speed for the user account to the online gaming environment.

8. The computer program product of claim 7, wherein determining the one or more deviations comprises analyzing a feature vector, generated by a machine learning model, the feature vector comprising a plurality of features extracted from the online gaming data and the historical online gaming data.

9. The computer program product of claim 7, wherein the action further comprises a ban for the user account from interacting with the online gaming environment.

10. The computer program product of claim 7 further comprising:

comparing the current playing style of the user account to a playing style of a trusted user account, wherein the user account and the trusted user account each comprise a first skill level;

determining a second skill level of the user account based at least in part on the current playing style;

enacting an action for the user account of the online gaming environment based on a determination that the second skill level exceeds the first skill level by a threshold level.

11. The computer program product of claim 7, wherein determining the current play style of the user account comprises:

analyzing one or more play characteristics, wherein the one or more play characteristics comprise an aiming criteria, a movement criteria, and a perspective view criteria.

12. The computer program product of claim 7, wherein the online gaming environment comprises an esport.

13. A system for identifying improper online user accounts, the system comprising:

a processor communicatively coupled to a memory, the processor configured to:

receive online gaming data associated with a user account of an online gaming environment;

access a player profile associated with the user account, wherein the player profile comprises historical online gaming data of a user;

analyze the historical online gaming data of the user to determine a historical play style of the user account;

analyze the online gaming data to determine a current play style of the user account;

compare the historical play style of the user to the current play style of the user account to determine one or more deviations between the current play style and the historical play style of the user account;

determine a violation level for the one or more deviations, the violation level being determined by one or more other player accounts in the online gaming environment providing a rating for each deviation in the one or more deviations; and enact an action for the user account of the online gaming environment based at least in part on the one or more deviations and the violation level for the one or more deviations, wherein the action comprises a throttling of internet access speed for the user account to the online gaming environment.

14. The system of claim 13, wherein determining the one or more deviations comprises analyzing a feature vector, generated by a machine learning model, the feature vector comprising a plurality of features extracted from the online gaming data and the historical online gaming data.

15. The system of claim 13, wherein the action further comprises a ban for the user account from interacting with the online gaming environment.

\* \* \* \* \*